United States Patent [19]
Rouger

[11] 3,838,863
[45] Oct. 1, 1974

[54] METAL-PLASTIC SEALING DEVICE

[75] Inventor: Henri André Rouger, Courbevoie, France

[73] Assignee: Commissariat A L'Energie Atomique, Paris, France

[22] Filed: Oct. 24, 1972

[21] Appl. No.: 300,234

[52] U.S. Cl. .................. 277/157, 277/180, 277/189
[51] Int. Cl. ............................................. F16j 15/06
[58] Field of Search ............ 285/DIG. 18, 339, 363, 285/108; 277/220, 180, 181, 182, 183, 189, 216, 154, 157, 199

[56] References Cited
UNITED STATES PATENTS

| | | | |
|---|---|---|---|
| 1,035,810 | 8/1912 | Osborne | 285/363 |
| 1,704,003 | 3/1929 | Johnson | 285/108 |
| 1,821,864 | 9/1931 | Wilson | 285/363 |
| 1,821,865 | 9/1931 | Wilson | 285/363 |
| 1,891,424 | 12/1932 | Kirkpatrick | 285/363 |
| 2,289,696 | 7/1942 | Cailloux | 285/108 |
| 2,900,199 | 8/1959 | Logan | 285/363 |
| 3,507,506 | 4/1970 | Tillman | 285/363 |

Primary Examiner—Louis R. Prince
Assistant Examiner—Robert I. Smith
Attorney, Agent, or Firm—Cameron, Kerkam, Sutton, Stowell & Stowell

[57] ABSTRACT

A metal plastic sealing device for providing a joint between two parts and comprising a deformable annular packing applied against the bottom and against one lateral wall of a recess formed in one of the parts to be joined in leak-tight manner, an annular spring of T cross-section which is coaxial with and applied against said packing as well as against the bottom of said recess but separated from the lateral wall of said recess by a free space, and a collar which forms a projection between the two parts and causes the lateral deformation of said packing and of said spring when said two parts are brought together.

9 Claims, 6 Drawing Figures

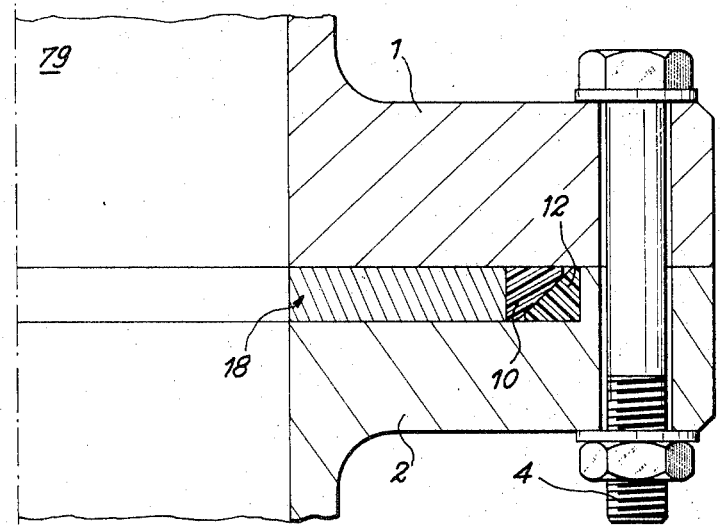
PRIOR ART  FIG. 3
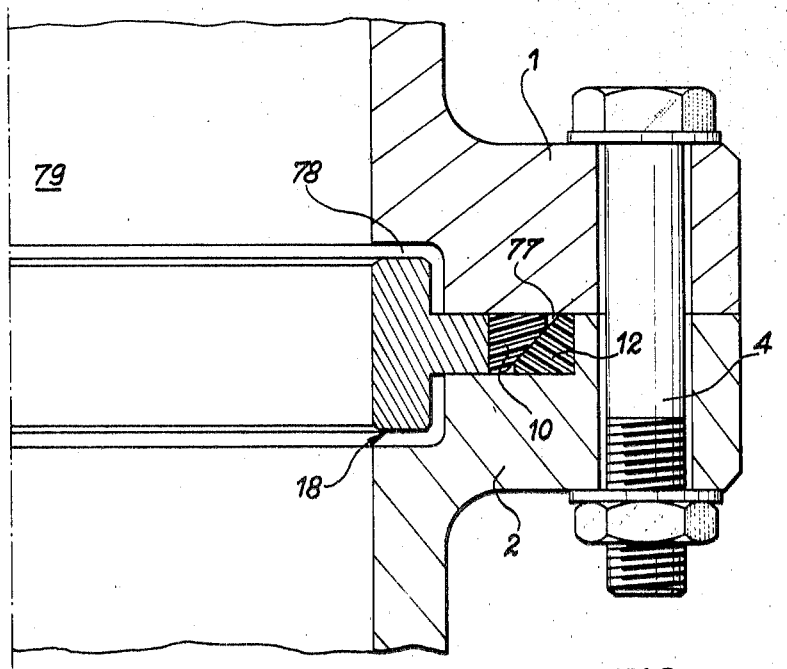
FIG. 4

METAL-PLASTIC SEALING DEVICE

The present invention relates to a metal-plastic sealing device.

It has already been proposed to provide a metal-plastic sealing device mounted at the point of junction of two parts, said device which will be referred to, in the following description, as "said device of the prior art" being provided with a deformable annular packing and an annular elastic system applied against a radial face of said packing, said elastic system and said packing being placed within a recess of one of the two parts; when these latter are brought together and clamped in position, their movement of closure causes radial deformation of the packing and compression of the elastic system.

In said device of the prior art, the packing is made up of two annular elements of plastic material and of triangular cross-section. At the time of clamping of the two parts which are to be made leak-tight at the joint line, the two elements which constitute the packing slide with respect to each other and exert radial pressure on the annular elastic system which is thus put in compression.

Similarly, once the two parts are clamped together, the annular elastic system exerts on the two elements of the packing a radial pressure which applies these latter in the axial direction against the faces of said two parts.

The radial thickness of the elastic system as calculated by means of the LAME formula is such that the radial pressure exerted by said elastic system on the two elements of the packing makes it possible to obtain an axial pressure which is higher than the threshold value imposed by the limit of leak-tightness.

The packing in accordance with said device of the prior art can also be made of a single annular element having a polygonal cross-section and deformed at the time of clamping of the two parts to be sealed. This plastic deformation of the packing takes place at constant volume and results in stressing of the annular spring or springs constituting the elastic system which is characteristic of the seal.

However, the construction in said device of the prior art patent of seals having large diameters is attended by the following drawbacks:

a. The radial thickness of the spring increases very rapidly with the diameter of the seal to be formed. This results in an overall radial width of the seal such that it is sometimes difficult to fit this latter within the available space. Moreover, the width of the flanges for clamping the seal is such that the cost price of these latter is accordingly increased to an appreciable extent.

b. The value of the radial deformation to be applied to the spring increases approximately linearly as a function of the diameter of the seal. It is apparent that, when this deformation has been obtained and when the parts to be joined in leak-tight manner are clamped together by radial slippage of the packing, the cross-section of said packing also increases as a function of the diamerer of the seal to be formed. This causes an increase in the stresses applied to the bolts and to the clamping flanges which must accordingly be given dimensions such that the stresses developed should remain within permissible limits.

The overall size, weight and cost price of assemblies thus formed consequently rise in accordance with a law of increase which is unfavourable to the use of seals having large diameters.

The essential aim of the present invention is to overcome the disadvantages which have just been described in the foregoing and to which the seals designed in accordance said device of the prior art are subject when these latter are of large diameter.

More precisely, the present invention relates to improvements which have been made in said device of the prior art and which lie in the fact that the elastic system is constituted by an annular spring having the following characteristics:

a. A flat rectangular cross-section replaced by a T-shaped cross-section of approximately equivalent sectional area. Thus, the overall radial width of the spring and consequently the width of the clamping flanges are reduced to an appreciable degree.

b. A spring mounted with radial prestress (compressive prestress or tensile prestress depending on whether the spring is placed respectively on the inside or on the outside of the packing) within the channel which serves as a housing for said spring.

There is thus added to the deformation caused by the prestress aforesaid the deformation which arises from radial slippage of the packings as caused by clamping of the flanges or of the two parts to be joined together in leak-tight manner.

The deformation of the spring which is produced by the packings can thus be of smaller value for a given total deformation than the value which it was necessary to obtain when constructing the seal of said device of the prior art. In consequence, the cross-sectional dimensions of the packings can be smaller, the result thereby achieved being as follows:

a reduction in cross-section, weight, overall size and cost price of the spring, a reduction in overall size, weight and cost price of the packings, a further reduction in overall size, weight and cost price of the flanges with respect to the above case (a).

c. The machined annular spring can advantageously be replaced by annular springs constituted by an assembly of a number of curved sectional elements. The joints of said elements are formed by interengagement of dowel-pins and dowel-holes.

The cost price of a spring of this type is much lower than that of a spring which is machined from a ferrule.

This novel arrangement offers an additional advantage in that it permits ready adjustment of the diameter of the spring to the diameter of the groove in which this latter is to be mounted: it is only necessary to insert at the level of one joint of the spring a shim having the same profile and a suitably chosen thickness.

Further characteristic features and advantages of the present invention will become apparent from the following description in which one embodiment of the device as well as variants of this embodiment are given by way of explanation but not in any sense by way of limitation, reference being had to the accompanying drawings, wherein:

FIG. 1 is a perspective view showing an annular spring of the device according to the present invention. Said annular spring has a T-shaped cross-section and can be machined or fabricated from one or a number of curved sectional elements. The cross-section has been purposely exaggerated with respect to the diameter in order to enhance the clarity of the drawing and in order that the details of the joints may thus be more clearly shown;

FIG. 3 is a transverse sectional view of said device of the prior art. The elastic system is constituted by an annular spring having a transverse cross-section in the shape of a flat rectangle;

FIG. 4 is a transverse sectional view of a device according to the present invention and comprising an annular spring having a T-shaped transverse cross-section;

in FIG. 5, the spring is shown at the beginning of engagement within its channel and in FIG. 6 the spring is fully engaged and put under compressive prestress.

Figure 1:
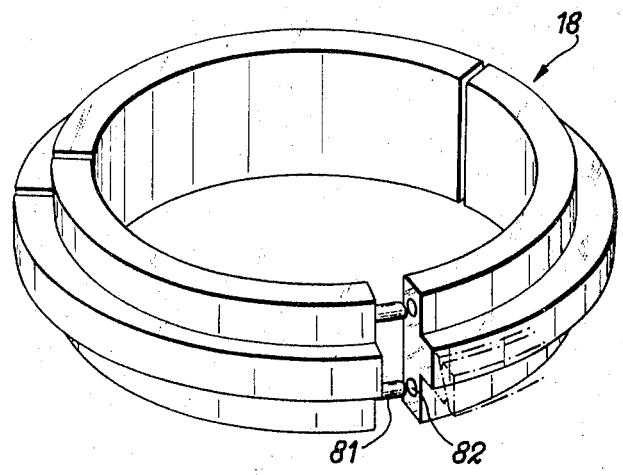

As is apparent from a comparison of FIGS. 3 and 4, the spring which is formed in accordance with the present invention permits a very appreciable reduction in the overall radial dimensions both of the seal and of the flanges in which said seal is mounted.

As shown in FIG. 4, a device in accordance with the present invention is constituted by an annular spring 18 and by a packing formed by two coaxial rings 10 and 12, the contacting surfaces of which have the shape of male and female cones in interfitting relation. These two conical surfaces have identical angles of slope and are therefore applied in close contact with each other, the inner ring 10 being intended to be inserted within the outer ring 12 in much the same manner as a wedge.

Said sealing device is placed at the level of the line of junction of the two flanges 1 and 2 which are clamped together by means of bolts 4. The annular spring 18 is housed within a channel 78 which is formed in the flanges 1 and 2, said channel being separate and distinct from the channel 77 in which is housed the packing 10, 12. The reference numeral 79 designates the duct in which a fluid is circulated.

In the case in which said device of the prior art is mounted in flanges, the spring of said device must not obstruct the duct 79 and this accordingly makes it necessary to increase the width of the flanges 1 and 2 to a considerable extent as shown in FIG. 3. In order to overcome this disadvantage, the present invention makes it possible to provide the annular spring with a transverse cross-section which is preferably T-shaped as this permits an appreciable reduction in the overall size of the seal and therefore in the width of the flanges (as shown in FIGS. 3 and 4). This reduction in the dimensions of the flanges makes it possible to reduce the weight and cost price of these latter to an appreciable extent.

Figure 2:
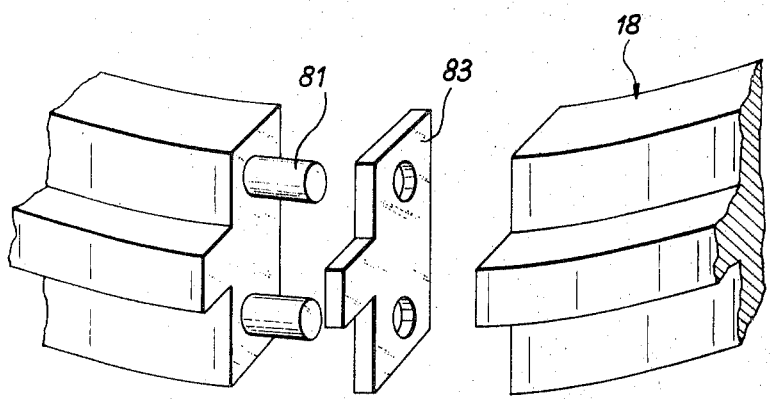
FIG. 2 is a perspective view showing one joint of a spring which is made up of a number of elements. Said joint is of the insertion type with two cylindrical dowel-pins and an adjusting shim for adapting the development of the spring to that of the groove or channel in which this latter is intended to be mounted.

In accordance with a further characteristic feature of the present invention, said springs can be constructed of one or a number of curved sectional elements. The joints of said elements are formed as shown in FIGS. 1 and 2 by interengagement of dowel-pins and dowel-holes 81 and 82 respectively. Said elements can have slightly different lengths and can thus be paired by virtue of a judicious choice and in such a manner as to ensure that the sum of the lengths of said elements corresponds to the development of the spring to be mounted within a channel of predetermined diameter.

It is also possible as shown in FIG. 2 to interpose adjusting shims 83 at one or a number of joints, the thickness of said shims being suitably chosen to ensure that the development of the assembly as thus constituted is adapted to the diameter of the channel.

In accordance with a further property of the present invention, it is possible to obtain the radial deformation of the spring in two separate stages:

During assembly of the spring within its channel, the spring is subjected to prestress which deforms this latter radially by a certain value $\Delta R_P$.

Depending on whether the packing is placed either on the inside or on the outside of the spring, said prestress corresponds respectively either to an extension or to a compression.

During clamping of the flanges, the slippage of the two packing elements (or the deformation of the packing in the case in which the cross-section of this latter assumes a polygonal shape) produces an increase in the radial deformation $\Delta R_G$ of the spring.

The total radial deformation is accordingly as follows:

$$\Delta R_T = \Delta R_P + \Delta R_G$$

It is readily apparent that, in the case of a total value $\Delta R$ which is either equal to or higher than the value obtained by means of said device of the prior art it can be considered sufficient in the case of the present invention to have a smaller value of $\Delta R_G$ as provided by the packings. In consequence, it is possible to employ packings having cross-sectional dimensions which are considerably smaller in comparison with those of packings employed in said device of the prior art.

This results in the following advantages:

a. An appreciable reduction in the efforts to be applied to the flanges in which the device is mounted.

A reduction in the clamping effort developed by the assembly bolts.

A reduction in the radial efforts applied to the channel which contains the packings.

This last-mentioned reduction permits the use of flanges having a smaller cross-section, such flanges being therefore of lighter weight and lower in cost price.

b. Said reduction in cross-section of the packings makes it possible to reduce the cost price of these latter to a considerable extent (reduction of the order of 50 percent).

c. A reduction in cross-section of the spring in the ratio of the reduction in linear dimensions of the packing cross-section. The overall size, weight and cost price of the spring are appreciably reduced in consequence.

Prestressing of the spring can be obtained either mechanically or by any other means for subjecting the spring either to elongation (if it is in extension under load) or to contraction (if it is in compression under load). In either case, the spring can either be heated (in an oven, for example) or cooled by immersion in a liquified gas, such as operation being carried out before the spring is placed in position within the channel which serves as a housing for this latter.

Figure 5:
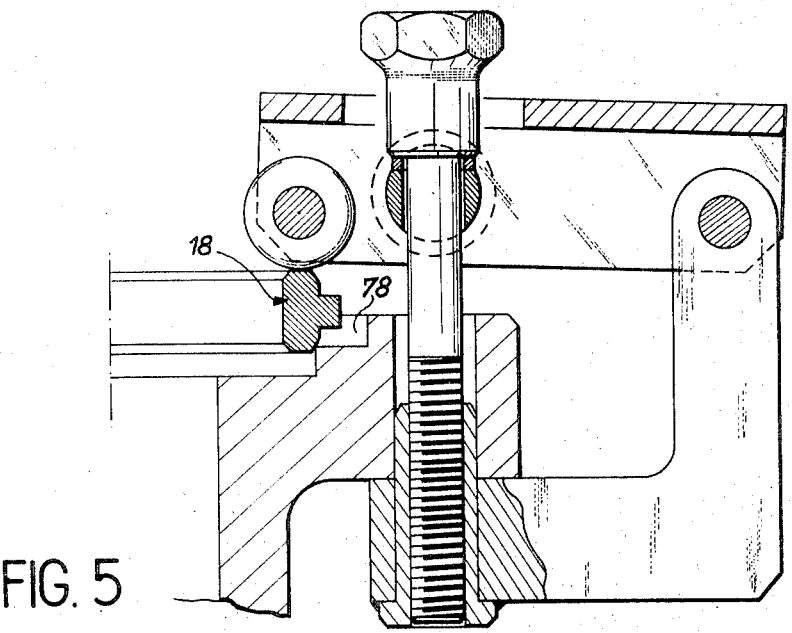
FIGS. 5 and 6 are transverse sectional views of an annular T-section spring according to the present invention, the spring being mounted with compressive prestress within the channel which serves as a recess therefor.
Figure 6:
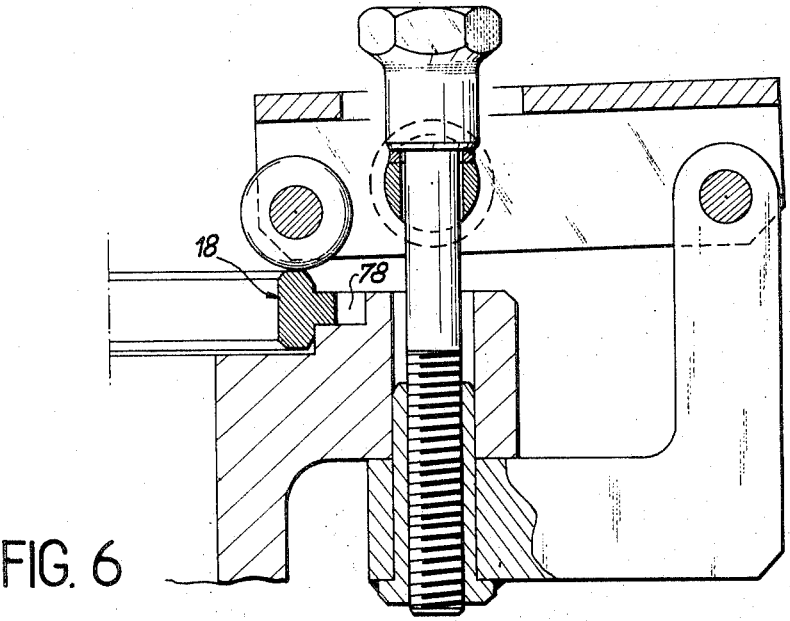

In accordance with a preferred but non-limitative mode of the invention, the annular spring 18 can also be given a T cross-section of cylindro-conical shape (as shown in FIGS. 5 and 6).

The spring 18 can also be forcibly engaged in its channel 78 as a result of a wedge effect by means of suitable tooling equipment. The diameter of the cylindrical portion of the cross-section is larger by 2 $\Delta R_P$ than the diameter of the channel 78.

When the spring 18 is precompressed the cylindrical portion is engaged within the channel 78. Said spring then takes up the position shown in FIG. 6.

The spring leaves this position when the radial slippage of the packings which is produced by tightening of the flanges imparts a complementary radial deformation $\Delta R_G$ to said spring.

In an alternative form (not shown) which is derived from the embodiment illustrated in FIG. 5, the external surface of the T-section annular spring as well as the lateral wall of the channel 78 are uniformly conical. These two conical surfaces have the same angle of slant, the value of which is such as to result in irreversibility. In other words, once the spring 18 has been forcibly inserted in the channel 78, it remains therein by virtue of the friction forces developed at the level of the bearing surface.

It is readily apparent that the present invention hereinbefore described has been given solely by way of explanation without any implied limitation and that any detail modifications can accordingly be made therein without departing from either the scope or the spirit of the invention.

I claim:

1. A sealing device for providing a joint between parts having two radially contacting faces and comprising a recess in at least one of the faces opening toward the other of the faces, said recess having a bottom parallel to said faces and a lateral wall, a deformable annular packing applied against the bottom and against the lateral wall of said recess and against the other face, a radially prestressed annular spring of T shaped cross-section having an annular head and an annular leg, said leg being in said recess coaxial with and applied against said packing and against the bottom of said recess and separated from the lateral wall of said recess by a space receiving said packing, and said spring maintaining a pressure on said packing which is independent of the force bringing said two parts together.

2. A device according to claim 1 including annular cooperating channels in said parts, said recess opening into said channels and said annular head fitting in said channels.

3. A device according to claim 1, wherein the profile of said spring is cylindro-conical, whereby said spring can be prestressed by mechanical insertion.

4. A device according to claim 1, wherein the profile of said spring is conical with a fairly small angle of slant in order that wedging of said spring within its channel which is also conical should be obtained at the time of application of prestress thereto.

5. A device according to claim 1, wherein said spring is obtained from curved sectional bars.

6. A device according to claim 1, wherein said spring is made up of a split ring.

7. A device according to claim 1, wherein said spring is constituted by at least two elements of circular arc.

8. A device according to claim 7, wherein the joints are formed by interengagement of dowel-pins and dowel-holes.

9. A device according to claim 1, wherein the application of prestress is facilitated by thermal contraction or expansion of the ring.

* * * * *